United States Patent [19]
Zeh

[11] Patent Number: 5,111,849
[45] Date of Patent: May 12, 1992

[54] HELICAL PIPES AND METHOD OF MANUFACTURE THEREOF

[75] Inventor: Bernhard Zeh, Trimmis, Fed. Rep. of Germany

[73] Assignee: EMS-Inventa AG, Switzerland

[21] Appl. No.: 456,366

[22] Filed: Dec. 26, 1989

[30] Foreign Application Priority Data

Dec. 29, 1988 [DE] Fed. Rep. of Germany ....... 3844256

[51] Int. Cl.⁵ .................................................. F16L 11/04
[52] U.S. Cl. .................................... 138/118; 267/166
[58] Field of Search ................... 138/118, 26, 28, 103, 138/109, 124, 125, 177, 178, DIG. 11; 267/166, 286

[56] References Cited

U.S. PATENT DOCUMENTS

| | | | |
|---|---|---|---|
| 2,905,194 | 9/1959 | Smith et al. | 138/177 X |
| 3,021,871 | 2/1962 | Rodgers | 138/118 |
| 3,211,473 | 10/1965 | Schmid | 138/118 X |
| 3,245,431 | 4/1966 | Coe | 138/125 |
| 3,288,169 | 11/1966 | Moss | 138/118 |
| 3,402,743 | 9/1968 | Brueder | 138/178 |
| 3,632,140 | 1/1972 | Paine et al. | 138/178 X |
| 3,936,417 | 2/1976 | Rouden | 138/118 X |
| 4,009,734 | 3/1977 | Sullivan | 138/118 X |
| 4,160,466 | 7/1979 | Joussou | 138/118 X |
| 4,869,471 | 9/1989 | Schwarz et al. | 267/166 X |

FOREIGN PATENT DOCUMENTS

| | | | |
|---|---|---|---|
| 1580539 | 9/1969 | France | 138/118 |
| 2056013 | 3/1981 | United Kingdom | 138/118 |

Primary Examiner—Daniel P. Stodola
Assistant Examiner—John P. Darling
Attorney, Agent, or Firm—Jordan B. Bierman

[57] ABSTRACT

Extruded pipes of thermoplastically processable polymers are wound cold around a mandrel and thereafter subject to thermal fixing. During or before winding, the pipe is twisted in a direction opposite to that of the helix formation, about its longitudinal axis, preferably through angles of 5° to 360° per coil. The resilience of the coiled pipe is surprisingly improved to the point where the resilience factor R approaches 1.0.

48 Claims, 1 Drawing Sheet

HELICAL PIPES AND METHOD OF MANUFACTURE THEREOF

This Application claims the priority of German 3844256.6, filed Dec. 29, 1988.

The present invention is directed to a method of making helical pipes and to pipes made thereby. Such pipes are extruded and wound in a coiled shape. This permits extension and retraction of the pipe based upon its inherent resilience.

BACKGROUND OF THE INVENTION

Helically wound pipes of the foregoing type are often used for carrying pressurized fluids. In particular, they find application in pneumatic devices generally useful in industry. In particular, they are found on trucks and tractor-trailer vehicles and act as a flexible connection between the towing vehicle and the trailer. Because of their ability to expand and contract, they obviate the necessity for reels, counter-weights, etc. for rolling up or stowing the required length of pipe.

German Patent 31 38 021 describes the process of manufacturing an untwisted wire helix, whose deformation forces are compensated after setting by an additional coaxial twist contracting the helix. Regarding German Patent 29 40 052, the twist stress resulting from the deformation manufacturing process forming the helix is reduced after having been set by a coaxial but opposite rotation. It is doubtful that pipes having larger wall thickness from polymers can be produced using these procedures.

In the past, such pipes have been produced by winding and thermofixing. U.S. Pat. Nos. 3,021,871 and 3,245,431, as well as British Patent 1,518,424 teach processes of this kind. However, the ability of such helical pipes to return to their original length on release of tension is limited and unsatisfactory.

In an effort to overcome this problem, multi-layer construction has been used. Also, suitable resilience has been sought by way of blending the polymer components of the material of which the pipe is made. However, with such modifications, it cannot be used in pipes which are intended for safety components and compressed air installations. This is particularly true if they are to come into contact with materials which have a solubilizing or extracting effect thereon. Such substances as fuels, lubricating oils, hydraulic oils, lacquers, and solvents all fall into this category. Furthermore, when the pipes are subjected to UV radiation or heat, embrittlement can occur, thereby rendering the pipes useless and even dangerous.

The measurement of the resilience of such pipes, particularly those intended for use in connection with air brakes, is set forth in DIN 74323 and in SAE J 844. In accordance with the former, for example, the helix is expanded for 60 seconds to a length of 5 meters by a maximum force of 50 N and the length $l_s$ is measured 5 minutes after release. In accordance with the following equation, the restoring factor R is calculated.

$$R = (l_s - a - b)/(l_o - a - b)$$

wherein $l_o$ is the original length of the pipe before the application of tension and a and b are the lengths of the connectors from each fitting to the beginning of each helix.

BRIEF DESCRIPTION OF THE INVENTION

It is among the objects of the present invention to provide helical pipes made from thermoplastically processable polymers which also have high resilience, whereby they return very close to their original lengths after tension thereon is released. It is also among the objects of the present invention to provide a helical pipe of the foregoing type which is suitable for industrial use, especially for use in connection with air brakes.

It is a feature of the present invention that the pipe, before or during its winding onto a mandrel, is twisted about its longitudinal axis in an upstream direction which is opposite to that in which the helix is formed. This expedient produces a very substantially improved resilience and reduces R to a very low and desirable value.

DETAILED DESCRIPTION OF THE INVENTION

The pipes of the present invention are desirably produced from thermoplastically processable polymers. The pipe is extruded in the usual manner, permitted to cool (preferably to room temperature or below), and then wound around a mandrel. It has been found that, by twisting the pipe in an upstream direction around its longitudinal axis, before or simultaneously with winding, a torsional stress is introduced which, at least to some extent, remains after the subsequent thermal fixing. The amount of the resilient force is dependent upon the angle of twist.

Preferably, the angle should be at least 5°, and, more preferably, more than 45°, per coil. It is most preferable that the twist angle be 180° to 360°. It has been found that an R of 1.8 can be achieved by the use of polyamide 12 as the processable polymer and a twist angle of 45°±10°. In order to obtain R's of less than 1.5, preferably less than 1.35, and most preferably in the range of 1.2, increasing twist angles of up to 360° per coil are effective. Of course, the particular material of which the pipe is made will affect the amount of twist which is most desirable. However, these values can easily be determined by the person of ordinary skill.

The dimensions of the pipe are determined in accordance with the intended use. For example, based upon the extruded but untwisted pipe, the internal diameter is from 2.0 to 26.0 mm, more preferably from 4.0 to 18.0 mm.

The average wall thickness is determined by the nature of the fluid and the internal pressure. In general, it is desirable to have an average wall thickness of 0.2 to 4.0 mm. Preferably, this dimension should be 0.3 to 3 mm, more preferably 0.75 to 2.5 mm, and most preferably 1.0 to 2.0 mm. Helical pipes of this type are suitable for operating pressures up to about 14 bar at room temperature and up to about 7 bar at 90° C. After twisting and winding of the extruded pipe onto the mandrel, it is then thermally fixed. It has been found advantageous to carry out the fixing step at 80° C. to 250° C. For polyamides, the more preferable range is 100° to 200°, most preferably, 120° to 160° C. For polyesters, it is more preferable to maintain the temperature between 100° and 230° C., most preferably between 130° to 180° C. Fixing may be advantageously effected in gas (preferably air) or, more preferably, in a liquid medium, such as mineral oil, silicone oil, or polydiols. The fixing time, in such cases, is only about 30-35% of the fixing time in air.

In principle, the fixing time depends on the wall thickness; i.e. for a 1 mm polyamide helix, approximately 10-15 minutes are required and for a 2 mm polyamide helix, 20-30 minutes are needed, when air is used as the medium.

As to the thermally processable polymer, particular mention may be made of one or more semi-crystalline polyamides, one or more amorphous polyamides, or mixtures thereof. In addition, such polyamides may be further blended with structurally different polyamides or even other polymers. Polyamide 11, polyamide 12, polyamide 12,12, polyamide 6, polyamide 6,6, and mixtures thereof are worthy of particular mention.

The processable polymer may also be a high molecular weight polyester and it has been found that mixtures of polyesters or polyester blends are especially useful. The polyester can have chains which have been chemically lengthened by the use of long chain glycols and/or one or more low molecular weight aliphatic diols.

High molecular weight polyester pipes have been produced wherein R's of 2.0 (after one minute of relief from the load and twist angles of 180°±10° per coil) have been obtained. Lower values of R can be obtained by increasing the twist angles up to about 360° per coil. The material of which the pipes are made is a factor in determining what the precise angle should be, but this can readily be determined by the person of ordinary skill.

The starting processable polymer may include various additives such as plasticizers, impact toughness modifiers, processing aids, coloring materials, etc. These additives may be incorporated up to about 35 percent by weight of the starting material. However, the modifiers, processing aids, and coloring agents should not exceed 30 percent for best results.

As a further modification of the present invention, the extruded pipes may be reinforced. Typically, this is done by the use of filaments, preferably in the form of a network, woven mesh, or braid. These may be metallic, textile, or plastic and preferably wrapped around the tube. The filaments may also be incorporated into the walls themselves. The pipe may also be encased in a protective sheath as needed.

BRIEF DESCRIPTION OF THE DRAWINGS

In the accompanying drawings, constituting a part hereof and in which like reference characters indicate like parts.

DETAILED DESCRIPTION OF THE DRAWING

Figure 1:
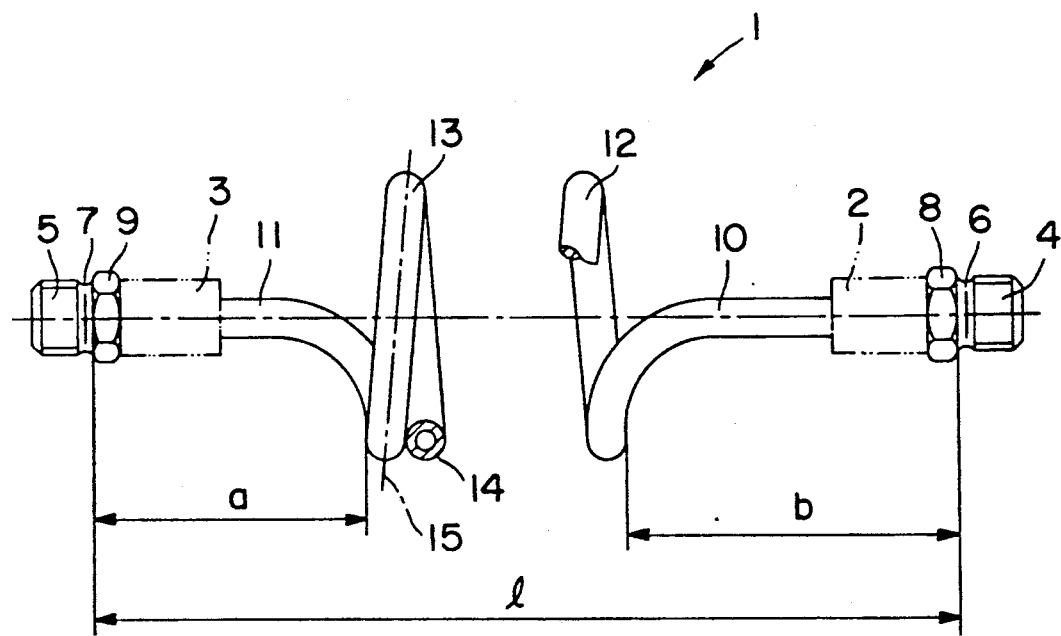
FIG. 1 is a schematic view, partially cut away, of a pipe according to the present invention.

Helical pipe 1 carries connection pieces 2 and 3 for attachment for fittings 4 and 5. The latter are provided with threads 6 and 7 on which nuts 8 and 9, which are attached to connection pieces 2 and 3, are tightened. Connection lengths 10 and 11 are the uncoiled portions of pipe 1.

A series of helical coils 12 and 13 provide the desired resilience. Referring more specifically to coil 13, it is twisted about its axis 15 after pipe 1 is extruded and before or simultaneously with wrapping pipe 1 about the mandrel (not shown) which gives it its helical shape.

Figure 2:
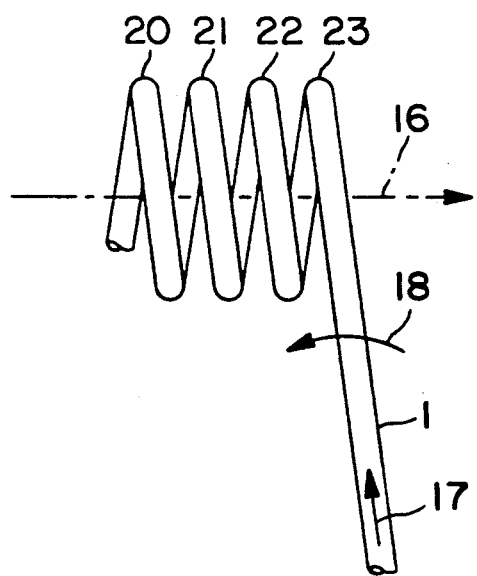
FIG. 2 is a schematic view showing the relationship between the winding of the coils of the helix and the direction of twist.

As is shown in FIG. 2, pipe 1 is wrapped around a mandrel (not shown) to form helical coils 20, 21, 22, and 23. The coils are laid down in that order by feeding pipe 1 in direction 17. It is a feature of the present invention that pipe 1 is twisted about its axis in upstream direction 18 which is opposite to the downstream direction 16 of formation of the helix.

Distances a and b (in FIG. 1) are the uncoiled portions of the pipe and correspond to those letters in the DIN formula for determining resilience. Thus, in the formula $$R = (l_s - a - b)/(l_o - a - b),$$

the ratio determined amounts to the length of the coiled portion after stressing and relaxation divided by the length of the original coiled portion. The connection lengths are eliminated from consideration because they do not flex.

In a preferred form of the device, braid 14 surrounds the walls of the pipe. This provides added strength and reduces the possibility of rupture.

The following examples are intended to illustrate the present invention and are not to be construed as limitative.

EXAMPLES 1 to 3

Three different polyamides were extruded on a Maillefer pipe extruder to form tubes having an internal diameter of 12 mm and a wall thickness of 1.5 mm. The materials used were respectively Grilon R47W40, a highly viscous polyamide 6 polymer; Grilamid L25W40, a highly viscous polyamide 12 polymer; and Rilsan Besno P40TL, a highly viscous polyamide 11 polymer. All three of the foregoing polymers are intended for extrusion of pipe, the first two are available from EMS-Chemie AG, Switzerland and the last can be obtained from Ato Chemie.

Twenty turns of the extruded pipes were wound cold around a mandrel having a diameter of 90 mm. For those pipes which were twisted in accordance with the present invention, the angle was set at 180° per coil. After winding, the helices were attached at both ends to the mandrel and thermally fixed in the presence of hot air for 20 minutes. After cooling, their resiliences were determined in accordance with DIN 74323. The relevant data and results are set forth in the following Table. In all cases, the tests bearing the letter A were the untreated pipe and those carrying the letter B were the same pipe twisted in accordance with the present invention.

| Example | Material | Thermofixing temperature (°C.) | Angle of twist | Restoring factor |
|---|---|---|---|---|
| 1A | R47W40 | 150–160 | 0° | 1.50 |
| 1B | R47W40 | 150–160 | 180° | 1.17 |
| 2A | L25W40 | 130–140 | 0° | 2.00 |
| 2B | L25W40 | 130–140 | 180° | 1.18 |
| 3A | Besno P40TL | 140–150 | 0° | 1.54 |
| 3B | Besno P40TL | 140–150 | 180° | 1.05 |

EXAMPLE 4

Hytrel 6356 (an elastomeric polyester available from DuPont, USA) was charged into a Maillefer pipe extruder to produce tubes having internal diameters of 12 mm and average wall thicknesses of 1.5 mm. Twenty turns of each pipe were wound cold around a mandrel having a diameter of 90 mm. As in Examples 1 to 3, in test A, no twist was applied and, in test B, the tubes were twisted about their longitudinal axes to the extent of 180° per coil. The twisting was carried out during winding and, after the ends of the tubes were attached to the mandrel, they were thermally fixed in air at 170°–180° C. for 20 minutes. After cooling, the resilience was determined.

In this case, the helices were loaded with a 1,000 g weight suspended for 24 hours. The load was then removed and the length of the helix was measured at specific time intervals. The starting length $l_0$ of each was 250 mm. The relevant data and results obtained are set forth in the following Table.

| Example | 4A | | 4B | |
| --- | --- | --- | --- | --- |
| Angle of twist | 0° | | 180° | |
| Time after load removal | $l_1$ (mm) | R | $l_1$ (mm) | R |
| 1 min. | 980 | 3.92 | 500 | 2.00 |
| 5 mins. | 940 | 3.76 | 430 | 1.72 |
| 15 mins. | 900 | 3.60 | 420 | 1.68 |
| 30 mins. | 810 | 3.24 | 360 | 1.44 |
| 24 hrs. | 710 | 2.84 | 300 | 1.20 |

While only a limited number of embodiments of the present invention have been expressly disclosed, it is, nonetheless, to be broadly construed and not to be limited except by the character of the claims appended hereto.

What is claimed is:

1. A method of making a resilient helical pipe from a thermoplastic processable polymer comprising winding a base pipe having a longitudinal axis around a mandrel in a downstream direction in a cold state to form a helix, twisting said pipe around said axis before or during said winding in an upstream direction opposite to said downstream direction to form twisted pipe, and thereafter thermally fixing said twisted pipe.

2. The method of claim 1 wherein said base pipe is extruded.

3. The method of claim 1 wherein said twisted pipe is twisted through an angle of at least 5° per coil.

4. The method of claim 3 wherein said angle is at least 45° per coil.

5. The method of claim 4 wherein said angle is 180° to 360° per coil.

6. The method of claim 1 wherein said base pipe has an internal diameter of 2.0 to 26.0 mm.

7. The method of claim 6 wherein said internal diameter is 4.0 to 18.0 mm.

8. The method of claim 7 wherein said base pipe has an average wall thickness of 0.2 to 4.0 mm.

9. The method of claim 8 wherein said wall thickness is 0.3 to 3.0 mm.

10. The method of claim 9 wherein said wall thickness is 0.75 to 2.5 mm.

11. The method of claim 10 wherein said wall thickness is 1.0 to 2.0 mm.

12. The method of claim 1 wherein said fixing is carried out at a fixing temperature of 80° to 250° C.

13. The method of claim 12 wherein said polymer is a polyamide and said fixing temperature is 100° to 200° C.

14. The method of claim 13 wherein said fixing temperature is 120° to 160° C.

15. The method of claim 12 wherein said polymer is a polyester and said fixing temperature is 100° to 230° C.

16. The method of claim 15 wherein said fixing temperature is 130° to 180° C.

17. The method of claim 1 wherein said helical pipe is reinforced.

18. The method of claim 17 wherein filaments surround said helical pipe.

19. The method of claim 18 wherein said filaments are plastic.

20. The method of claim 18 wherein said filaments are metal.

21. The method of claim 18 wherein said filaments are a braid.

22. The method of claim 18 wherein said filaments are a textile.

23. The method of claim 17 comprising surrounding said extruded pipe with a sheath.

24. The method of claim 1 wherein said fixing is carried out in a medium inert to said processable polymer.

25. The method of claim 24 wherein said fixing is carried out in air.

26. The method of claim 24 wherein said fixing is carried out in a liquid medium.

27. The method of claim 26 wherein said medium is silicone oil.

28. The method of claim 26 wherein said medium is polydiol.

29. The method of claim 26 wherein said medium comprises mineral oil.

30. The method of claim 1 wherein said processable polymer comprises at least one semicrystalline polyamide.

31. The method of claim 30 wherein said processable polymer further comprises at least one polyolefin.

32. The method of claim 30 wherein said processable polymer further comprises at least one copolyolefin.

33. The method of claim 30 wherein said processable polymer further comprises at least one polyurethane.

34. The method of claim 30 wherein said processable polymer further comprises at least one polyester.

35. The method of claim 30 wherein said semicrystalline polyamide comprises polyamide 11.

36. The method of claim 30 wherein said semicrystalline polyamide comprises polyamide 12.

37. The method of claim 30 wherein said semicrystalline polyamide comprises polyamide 12, 12.

38. The method of claim 30 wherein said semicrystalline polyamide comprises polyamide 6.

39. The method of claim 30 wherein said semicrystalline polyamide comprises polyamide 6, 6.

40. The method of claim 1 wherein said processable polymer comprises at least one amorphous polyamide.

41. The method of claim 40 wherein said processable polymer further comprises at least one polyolefin.

42. The method of claim 40 wherein said processable polymer further comprises at least one copolyolefin.

43. The method of claim 40 wherein said processable polymer further comprises at least one polyurethane.

44. The method of claim 40 wherein said processable polymer further comprises at least one polyester.

45. The method of claim 1 wherein said processable polymer comprises at least one polyester.

46. The method of claim 1 wherein said processable polymer comprises a polyester blend.

47. The method of claim 1 wherein said processable polymer comprises a total of up to 35 percent of weight of material consisting of at least one of plasticizers, impact modifiers, and processing aids.

48. The method of claim 47 wherein said plasticizers and said impact modifiers together constitute a maximum of 30 percent of weight of said processable polymer.

* * * * *